United States Patent
Malhotra

US 006509393B2

(10) Patent No.: US 6,509,393 B2
(45) Date of Patent: Jan. 21, 2003

(54) PHASE CHANGE INKS

(75) Inventor: Shadi L. Malhotra, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/814,895

(22) Filed: Mar. 22, 2001

(65) Prior Publication Data

US 2002/0137816 A1 Sep. 26, 2002

(51) Int. Cl.[7] .................... C09D 11/10; C08K 5/05; C08L 23/06; C08L 23/08; C08L 33/02
(52) U.S. Cl. ............. 523/160; 524/379; 524/380; 524/388; 524/556; 524/585
(58) Field of Search ................. 523/160, 161; 106/31.29, 31.61; 524/556, 585, 379, 380, 388

(56) References Cited

U.S. PATENT DOCUMENTS

| | | | |
|---|---|---|---|
| 4,745,419 A | 5/1988 | Quate et al. | 346/140 R |
| 4,751,528 A | 6/1988 | Spehrley, Jr. et al. | 346/140 R |
| 4,791,439 A | 12/1988 | Guiles | 346/140 R |
| 4,853,036 A | 8/1989 | Koike et al. | 106/20 |
| 5,006,170 A | 4/1991 | Schwarz et al. | 106/20 |
| 5,041,161 A | 8/1991 | Cooke et al. | 106/22 |
| 5,111,220 A | 5/1992 | Hadimioglu et al. | 346/140 R |
| 5,121,141 A | 6/1992 | Hadimioglu et al. | 346/140 R |
| 5,122,187 A | 6/1992 | Schwarz et al. | 106/25 |
| 5,124,718 A | 6/1992 | Koike et al. | 346/1.1 |
| 5,185,035 A * | 2/1993 | Brown et al. | 106/31.29 |
| 5,371,531 A | 12/1994 | Rezanka et al. | 347/43 |
| 5,541,627 A | 7/1996 | Quate | 347/10 |
| 5,669,965 A * | 9/1997 | Sawada et al. | 106/31.29 |
| 5,698,017 A | 12/1997 | Sacripante et al. | 106/31.49 |
| 5,922,117 A | 7/1999 | Malhotra et al. | 106/31.58 |
| 5,958,121 A * | 9/1999 | Lin | 106/31.43 |
| 6,066,200 A | 5/2000 | Breton et al. | 106/31.43 |
| 6,071,333 A | 6/2000 | Breton et al. | 106/31.43 |
| 6,106,602 A * | 8/2000 | Ouchi et al. | 106/31.61 |
| 6,235,098 B1 * | 5/2001 | Maekawa et al. | 106/31.61 |
| 6,319,310 B1 * | 11/2001 | Wong et al. | 106/31.29 |
| 6,350,795 B1 * | 2/2002 | Breton et al. | 523/160 |

FOREIGN PATENT DOCUMENTS

GB    2085459 A  *  4/1982
WO    WO 93/22775 A1  *  11/1993

OTHER PUBLICATIONS

Aldrich Catalog; Aldrich Chemical Company, Milwaukee, WI 1998–1999 (p. 1372).*

* cited by examiner

Primary Examiner—Vasu Jagannathan
Assistant Examiner—Callie E. Shosho
(74) Attorney, Agent, or Firm—Judith L. Byorick

(57) ABSTRACT

Disclosed is an ink composition comprising (a) a polyethylene homopolymer or copolymer binder having a melting point of from about 60 to about 150° C., (b) a nonpolymeric alcohol viscosity modifier having a melting point of from about 60 to about 150° C., (c) a colorant, (d) an optional conductivity enhancing agent, (e) an optional antioxidant, and (f) an optional UV absorber.

19 Claims, No Drawings

PHASE CHANGE INKS

U.S. application Ser. No. 09/300,298, filed Apr. 27, 1999, entitled "Ink Compositions," with the named inventors Shadi L. Malhotra, Raymond W. Wong, and Marcel P. Breton, the disclosure of which is totally incorporated herein by reference, discloses an ink composition comprising (1) an oxazoline compound; (2) a thiourea compound with an optional melting point of from about 25 to about 100° C., and with an optional acoustic loss value of from about 5 to about 40 dB/mm; (3) an alcohol; (4) a lightfastness compound; (5) an antioxidant; and (6) a colorant.

U.S. application Ser. No. 09/300,331, filed Apr. 27, 1999, entitled "Ink Compositions," with the named inventors Marcel P. Breton, Shadi L. Malhotra, Raymond W. Wong, Danielle C. Boils, Carl P. Tripp, and Pudupadi R. Sundararajan, the disclosure of which is totally incorporated herein by reference, discloses an ink composition comprising (1) a solid oxazoline compound with a melting point of from about 60° C. to about 120° C. and an acoustic loss value of from about 25 to about 80 dB/mm; (2) a carbamate compound with a melting point of from about 25° C. to about 100° C.; (3) an alcohol compound; (4) a lightfastness component; (5) a lightfastness antioxidant; and (6) a colorant.

BACKGROUND OF THE INVENTION

The present invention is directed to phase change (hot melt) ink compositions. More specifically, the present invention is directed to phase change ink compositions suitable for use in ink jet printing processes, including piezoelectric ink jet printing processes, acoustic ink jet printing processes, and the like. One embodiment of the present invention is directed to an ink composition comprising (a) a polyethylene homopolymer or copolymer binder having a melting point of from about 60 to about 150° C., (b) a nonpolymeric alcohol viscosity modifier having a melting point of from about 60 to about 150° C., (c) a colorant, (d) an optional conductivity enhancing agent, (e) an optional antioxidant, and (f) an optional UV absorber.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate such that the resulting image exhibits a hardness value of from about 0.1 to about 0.5 millimeter (measured with a penetrometer according to the ASTM penetration method D1321).

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In hot melt ink jet printing processes employing these phase change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase change ink is applied to the substrate, freezing on the substrate resolidifies the ink. When the printer employs a piezoelectric hot melt ink jet printing process, a plurality of ink jet nozzles is provided in a printhead. A piezoelectric vibrating element is located in each ink channel upstream from a nozzle so that the piezoelectric oscillations propel ink through the nozzle. After the phase change ink is applied to the substrate, freezing on the substrate resolidifies the ink.

In phase change printing processes, the ink preferably undergoes a change with temperature from a solid state to a liquid state in a desirably short period of time, typically in less than about 100 milliseconds. One advantage of phase change inks is their ability to print superior images on plain paper, since the phase change ink quickly solidifies as it cools, and, since it is primarily waxy in nature, it does not normally soak into a paper medium.

Phase change inks also preferably exhibit a high degree of transparency, generally measured in terms of haze value of the ink. Transparent, low haze inks exhibit high gloss and high optical density compared to opaque inks, although both may appear to be evenly colored.

The use of phase change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also be attracted by an electric field.

Phase change inks used in acoustic ink printing processes also preferably exhibit a low acoustic loss value, typically below about 100 decibels per millimeter. In addition, the ink vehicle preferably can fill the pores of a porous substrate, such as paper, and preferably has a melting point of from about 80 to about 120° C.; this melting point, along with low acoustic loss, enables a minimization of energy consumption. When the phase change inks are used in an electric field assisted acoustic ink printing process, the inks also are sufficiently conductive to permit the transmission of electrical signals generated by the electric field assisted acoustic ink jet printer: the inks preferably exhibit a conductivity of from about 2 to about 9 log(picomho/cm) (measured under melt conditions at about 150° C. by placing an aluminum electrode in the molten ink and reading the resistivity output on a GenRad 1689 precision RLC Digibridge at a frequency of 1 kiloHertz). In general, the conductivity of a material can be measured in terms of the reciprocal of resistivity, which is the capacity for electrical resistance. Further information regarding electric field assisted acoustic ink printing processes is disclosed in, for example, U.S. application Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference, which discloses a method of forming and moving ink drops across a gap between a printhead and a print medium or intermediate print medium in a marking device. The method includes generating an electric field, forming the ink drops adjacent to the printhead, and controlling the electric field. The electric field is generated to extend across the gap. The ink drops are formed in an area adjacent to the printhead. The electric field is controlled such that an electrical attraction force exerted on the formed ink drops by the electric field is the greatest force acting on the ink drops. The marking device can be incorporated into a transfuse printing system having an intermediate print medium made of one or more materials that allow for lateral dissipation of electrical charge from the incident ink drops.

U.S. Pat. No. 4,751,528 (Spehrley, Jr. et al.), the disclosure of which is totally incorporated herein by reference, discloses a hot melt ink jet system including a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

U.S. Pat. No. 4,791,439 (Guiles), the disclosure of which is totally incorporated herein by reference, discloses an ink jet apparatus for use with hot melt ink having an integrally connected ink jet head and reservoir system, the reservoir system including a highly efficient heat conducting plate, such as aluminum, inserted within an essentially non-heat conducting reservoir housing. The reservoir system has a sloping flow path between an inlet position and a sump from which ink is drawn to the head, and includes a plurality of vanes situated upon the plate for rapid heat transfer.

U.S. Pat. No. 4,853,036 (Koike et al.) and U.S. Pat. No. 5,124,718 (Koike et al.), the disclosures of each of which are totally incorporated herein by reference, disclose an ink for ink-jet recording which comprises a liquid composition essentially comprised of a coloring matter, a volatile solvent having a vapor pressure of 1 mmHg or more at 25° C., and a material being solid at room temperature and having a molecular weight of 300 or more; and prepared so as to satisfy formula $B_1/A_1 \geq 3$, assuming viscosity as $A_1$ cP at 25° C. measured when the content of the solid material in said composition is 10 percent by weight, and assuming viscosity as $B_1$, cP at 25° C. measured when the content of the solid material in said composition is 30 percent by weight. An ink-jet recording process employing the above mentioned ink is also provided.

U.S. Pat. No. 5,006,170 (Schwarz et al.) and U.S. Pat. No. 5,122,187 (Schwarz et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons: esters: phenols, amides; imides; halocarbons; urethanes: ethers; sulfones; sulfamides; sulfonamindes; phosphites; phosphonates; phosphates; alkyl sulfines; alkyl acetates; and sulfur dioxide. Also disclosed are hot melt ink compositions suitable for ink jet printing which comprise a colorant, a propellant, and a binder selected from the group consisting of rosin esters; polyamides: dimer acid amides; fatty acid amides; epoxy resins, fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,041,161 (Cooke et al.), the disclosure of which is totally incorporated herein by reference, discloses an ink jet ink which is semi-solid at room temperature. The subject ink combines the advantageous properties of thermal phase change inks and liquid inks. More particularly, the inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of above 45° C. to about 110° C., at which temperature the ink has a viscosity of about 10 to 15 centipoise. The subject inks exhibit controlled penetration and spreading, but do not remain on the surface of most substrates where they would be prone to burnishing, cracking or flaking. These inks further comprise 0.1 to 30 weight percent of a colorant system.

U.S. Pat. No. 5,111,220 (Hadimoglu et al.), the disclosure of which is totally incorporated herein by reference, discloses a method of fabricating an acoustic ink printhead with an integrated liquid level control layer. With standard photolithographic techniques, acoustic lenses and ink supply channels are defined in a substrate. Apertures are created in a spacer layer plate to define cavities to hold the ink reservoirs for each ejector. Corresponding alignment holes are also made in the substrate and in the spacer layer plate. With spheres matching the size of the alignment holes, the spheres engage the alignment holes to precisely align the apertures in the spacer layer plate with the acoustic lenses in the substrate. The plate and substrate are then bonded for an integrated acoustic printhead with liquid level control by capillary action.

U.S. Pat. No. 5,121,141 (Hadimoglu et al.), the disclosure of which is totally incorporated herein by reference, discloses an acoustic ink printhead with an integrated liquid level control layer. A spacer layer is fixed to a substrate. Apertures are created in the spacer layer, which is then used as a mask, to define acoustic lenses and ink supply channels in the substrate. The apertures in the spacer layer used to define self-aligned acoustic lenses and to form the cavities to hold the ink reservoirs for each ejector. The thickness of the spacer layer is set so that acoustic waves from the acoustic lens below are focused at the free surface of the ink which maintains its level at the top of the spacer layer by capillary action.

U.S. Pat. No. 5,371,531 (Rezanka et al.), the disclosure of which is totally incorporated herein by reference, discloses a multi-color ink-jet printer in which a first partial image is created on a recording medium, and then a second partial image is created on the same recording medium after the first partial image is substantially dried. The first partial image comprises an ink which dries at a slower rate than that of the second partial image. In one embodiment, means are provided for heating the recording medium prior to the creation of the second partial image.

U.S. Pat. No. 5,698,017 (Sacripante et al.), the disclosure of which is totally incorporated herein by reference, discloses an ink composition comprising a colorant and a vehicle component, and which vehicle component comprises the condensation product of an organic acid and an amino alcohol.

U.S. Pat. No. 5,922,117 (Malhotra et al.), the disclosure of which is totally incorporated herein by reference, discloses an ink composition comprising (1) a liquid alcohol vehicle, (2) a solid alcohol compound, (3) a quaternary compound, (4) a lightfastness UV absorber, (5) a lightfastness antioxidant, and (6) a colorant.

U.S. Pat. No. 6,066,200 (Breton et al.), the disclosure of which is totally incorporated herein by reference, discloses an ink composition comprising (1) a solid urea compound; (2) an alcohol, (3) a lightfastness component; (4) a lightfast antioxidant: and (5) a colorant.

U.S. Pat. No. 6,071,333 (Breton et al.), the disclosure of which is totally incorporated herein by reference, discloses an ink composition containing (1) a solid carbamate compound, (2) an alcohol compound with a melting point of from about 25° C. to about 90° C.; (3) a lightfastness component, (4) a lightfastness antioxidant; and (5) a colorant.

While known compositions and processes are suitable for their intended purposes, a need remains for phase change inks that are suitable for hot melt ink jet printing processes, such as hot melt piezoelectric ink jet printing processes and the like. Further, a need remains for phase change inks that are suitable for hot melt acoustic ink jet printing processes. Additionally, a need remains for phase change inks that, upon cooling, form images with desirable hardness values. There is also a need for phase change inks that, upon cooling, form images that are robust and abrasion resistant. In addition, there is a need for phase change inks that form images compatible with a wide variety of print substrates, such as plain papers, coated papers, transparencies, and the like. Further, there is a need for phase change inks that form images of photographic quality, particularly when printed on plain paper. Additionally, there is a need for phase change inks that generate waterfast images. A need also remains for phase change inks that generate lightfast images. In addition, a need remains for phase change inks that generate high quality images on a wide variety of substrates, including plain paper. Further, a need remains for phase change inks that generate fast-drying images. Additionally, a need remains for phase change inks that generate high quality text images. There is also a need for phase change inks that generate high quality graphics images. In addition, there is a need for phase change inks that form images wherein the colorant is retained on the surface of the print substrate while the ink vehicle can continue to spread throughout the substrate. Further, there is a need for phase change inks that generate images-with minimal feathering. Additionally, there is a need for phase change inks that exhibit minimal intercolor bleed when two inks of different colors are printed adjacent to each other on a substrate. A need also remains for phase change inks that generate images with high image permanence. In addition, a need remains for phase change inks suitable for ink jet printing processes wherein the substrate is heated prior to printing and is cooled to ambient temperature subsequent to printing (also known as heat and delay printing processes). Further, a need remains for phase change inks that can generate images of desirably high optical density values even when the inks contain relatively low colorant concentrations. Additionally, a need remains for phase change inks that, when printed onto substrates, cause minimized curling of the substrate. There is also a need for phase change inks that exhibit desirable crease resistance. In addition, there is a need for phase change inks that generate images with desirably high transparency and projection efficiency. Further, there is a need for phase change inks wherein the speculate size of spherical ink crystals formed therein during cooling and solidification can be reduced from about 6 to 9 microns to about 2 to 4 microns. Additionally, there is a need for phase change inks wherein the speculate size of spherical ink crystals formed therein during cooling and solidification can be reduced from about 6 to 9 microns to about 1 to 3 micron when the inks further contain crystallinity inhibitors derived from, for example, low viscosity unsaturated aliphatic acid compounds. There is also a need for phase change inks that, when incorporated into an ink jet printer, exhibit controlled jettability. In addition, there is a need for phase change inks that generate images with excellent projection efficiency, with no need for a post fusing step to achieve such efficiency. Further, there is a need for phase change inks that generate images with desirably high waterfastness values. Additionally, there is a need for phase change inks that generate images with desirably high lightfastness values. A need also remains for phase change inks that exhibit desirable viscosity values at hot melt ink printing temperatures.

SUMMARY OF THE INVENTION

The present invention is directed to an ink composition comprising (a) a polyethylene homopolymer or copolymer binder having a melting point of from about 60 to about 150° C., (b) a nonpolymeric alcohol viscosity modifier having a melting point of from about 60 to about 150° C., (c) a colorant, (d) an optional conductivity enhancing agent, (e) an optional antioxidant, and (f) an optional UV absorber.

DETAILED DESCRIPTION OF THE INVENTION

Inks of the present invention contain a binder which is a homopolymer (including substituted homopolymers) or copolymer (including substituted copolymers) of polyethylene. The binder typically has a melting point of at least about 60° C., preferably at least about 90° C., and more preferably at least about 110° C., and typically has a melting point of no more than about 150° C., preferably no more than about 135° C., and more preferably no more than about 115° C., although the melting point can be outside of these ranges. In specific embodiments, the binder has a hardness value of at least about 70, more preferably at least about 80, and even more preferably at least about 90, with there being no upper limit on hardness, although the hardness value can be outside of these ranges. Copolymers can be random, alternating, block, graft, or the like. The homopolymers and copolymers can be substituted with functional groups, including (but not limited to) one or more of alkyl groups, substituted alkyl groups, aryl groups, substituted aryl groups, arylalkyl and alkylaryl groups, substituted arylalkyl and alkylaryl groups, alkoxy groups, aryloxy groups, arylalkyloxy and alkylaryloxy groups, hydroxy groups, halogen atoms, amine groups, imine groups, ammonium groups, cyano groups, pyridine groups, pyridinium groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, wherein two or more substituents can be joined together to form a ring. Examples of suitable binders include (but are not limited to) (1) polyethylene monoalcohols, of the general formula $CH_3(CH_2CH_2)_nCH_2OH)$, wherein n represents the number of repeat —$H_2CH_2$—units, such as (a) where Mn=460; viscosity at 150° C.=3.2 centipoise; melting point=86° C.; hardness value=73.3 (Aldrich 44,447-2),and (b) where Mn=700; viscosity at 150° C.=7.9 centipoise; melting point=110° C. (Aldrich 44,448-0); (2) polyethylene-block-poly(alkylene glycol)s, wherein the alkylene portion is ethylene, propylene, butylene,pentylene, or the like, including polyethylene-block-poly (ethyleneglycol)s, of the general formula $CH_3(CH_2CH_2)_x(OCH_2CH_2)_yOH$, wherein x represents the number of repeat —$CH_2CH_2$—units and y represents the number of repeat —$OCH_2CH_2$—units, such as (a) where Mn=575; 20 percent by weight ethylene oxide; melting point=91° C. (Aldrich 45,900-3), (b) where Mn=875; 20 percent by weight ethylene oxide; melting point=106° C. (Aldrich 45,899-6), (c) where Mn=920; 50 percent by weight ethylene oxide; melting point=105° C. (Aldrich 45,898-8), and (d) where Mn=1400; 50 percent by weight ethylene oxide, melting point=106° C. (Aldrich 45,896-1); (3) oxidized polyethylenes, such as those where Mn=1300; viscosity at 125° C.=225 centipoise (Aldrich 19,191-4); (4)polyethylene monocarboxylic acids, of the general formula $CH_3(CH_2CH_2)_nCOOH$, wherein n represents the number of repeat —$CH_2CH_2$—units, such as Aldrich 40,706-2, melting point=108–110° C.; hardness value 78.7; (5) copolymers of polyethylene with unsaturated acids, such as acrylic acid, methacrylic acid, and the like, including poly(ethylene-co-acrylic acid)s, of the general formula $CH_3(CH_2CH_2)_x(CH_2CH(COOH))_y$, wherein x represents the number of repeat —$CH_2CH_2$— units and y represents the number of repeat —$CH_2CH(COOH)$— units, including those with acrylic acid contents of from about 5 to about 20 percent by weight, and the like, as well as mixtures thereof.

The polyethylene homopolymer or copolymer binder is present in the ink in any desired or effective amount, typically at least about 5 percent by weight of the ink, preferably at least about 10percent by weight of the ink, and more preferably at least about 15 percent by weight of the ink, and typically no more than about 30 percent by weight of the ink, preferably no more than about 25 percent by weight of the ink, and more preferably no more than about 20 percent by weight of the ink, although the amount can be outside of these ranges.

Inks of the present invention also contain a nonpolymeric alcohol viscosity modifier. The viscosity modifier typically has a melting point of at least about 60° C., preferably at least about 80° C., and more preferably at least about 100° C., and typically has a melting point of no more than about 150° C., preferably no more than about 130° C., and more preferably no more than about 115° C., although the melting point can be outside of these ranges. In embodiments wherein the ink of the present invention is to be used in an acoustic ink printing process, the viscosity modifier preferably (although not necessarily) has an acoustic loss value of no more than about 60 decibels per millimeter (with there being no lower limit on acoustic loss value), although the acoustic loss value can be outside of this range. At ink jet operating temperatures, the viscosity modifier generally has a viscosity lower than that of the binder. The viscosity modifier is also selected to be compatible with the binder so that no phase separation between binder and viscosity modifier occurs after the ink has been jetted onto a recording substrate. The alcohol compound can have one or more hydroxy groups. Examples of suitable viscosity modifiers include (but are not limited to) (A) benzyl alcohol derivatives, such as (1) 2-hydroxybenzyl alcohol (Aldrich 16,695-29), (2) 4-hydroxybenzyl alcohol (Aldrich H2,080-6), (3) 4-nitrobenzyl alcohol (Aldrich N1,282-1), (4) 4-hydroxy-3-methoxy benzyl alcohol (Aldrich 17,553-6, hardness value of 83.4), (5) 3-methoxy-4-nitrobenzyl alcohol (Aldrich 19,383-6), (6) 2-amino-5-chlorobenzyl alcohol (Aldrich 33,953-9), (7) 2-amino-5-methylbenzyl alcohol (Aldrich 33,298-4), (8) 3-amino-2-methylbenzyl alcohol (Aldrich 33,420-0), (9) 3-amino-4-methylbenzyl alcohol (Aldrich 33,532-0), (10) 2(2-(aminomethyl)phenylthio) benzyl alcohol (Aldrich 34,631-4), (11) 2,4,6-trimethylbenzyl alcohol(Aldrich 19,163-9), and the like, (B) diols, such as (1) 2-amino-2-methyl-1,3-propanediol (Aldrich A6,517-4), (2) 2-amino-1-phenyl-1,3-propanediol (Aldrich 24,888-6), (3) 2,2-dimethyl-1-phenyl-1,3-propanediol (Aldrich 40,873-5, hardness value of 75), (4) 2-bromo-2-nitro-1,3-propanediol (Aldrich 13,470-8), (5) 3-tert-butylamino-1,2-propanediol (Aldrich 47,298-0), (6) 1,1-diphenyl-1,2-propanediol (Aldrich 36,490-8), (7) 1,4-dibromo-2,3-butanediol (Aldrich 23,757-4), (8) 2,3-dibromo-1,4-butanediol (Aldrich 30,104-3), (9) 2,3-dibromo-2-butene-1,4-diol (Aldrich 14,370-7), (10) 1,1,2-triphenyl-1,2-ethanediol (Aldrich 36,743-5), and the like, (C) other alcohols, such as (1) 2-naphthalenemethanol (Aldrich 18,731-3), (2) 2-methoxy-1-naphthalenemethanol (Aldrich 44,293-3), (3) decafluoro benzhydrol (Aldrich 19,658-4), (4) 2-methylbenzhydrol (Aldrich 18,996-0), (5) 1-benzeneethanol (Aldrich B,300-0), (6) 4,4'-isopropylidene bis(2-(2,6-dibromo phenoxy)ethanol) (Aldrich 19,443-3), (7) (2,2'-(1,4-phenylenedioxy)diethanol) (Aldrich 23,791-4, hardness value of 82), (8) 2,2-bis(hydroxymethyl)-2,2',2"-nitrilotriethanol (Aldrich 15,666-3, hardness value of 82.2), (9) di(trimethylolpropane) (Aldrich 41,613-4, hardness value of 85.8), (10) 2-amino-3-phenyl-1-propanol (Aldrich19,043-8), (11) tricyclohexylmethanol (Aldrich 18,058-0), (12) tris(hydroxymethyl)aminomethane succinate (Aldrich 34,068-5), (13) 4,4'-trimethylene bis(1-piperidine ethanol) (Aldrich 12,122-35, hardness value of 78), (14) N-methyl glucamine (Aldrich M4,700-0, hardness valueof 83.2), (15) xylitol (Aldrich 85,158-2), and the like; and the like, as well as mixtures thereof.

The nonpolymeric alcohol viscosity modifier is present in the ink in any desired or effective amount, typically at least about 30 percent by weight of the ink, preferably at least about 35 percent by weight of the ink, and more preferably at least about 40 percent by weight of the ink, and typically no more than about 55 percent by weight of the ink, preferably no more than about 50 percent by weight of the ink, and more preferably no more than about 45 percent by weight of the ink, although the amount can be outside of these ranges.

The inks of the present invention also contain a colorant. Any desired or effective colorant can be employed in the inks of the present invention, including dyes, pigments, mixtures thereof, and the like, provided that the colorant can be dissolved or dispersed in the ink vehicle. The colorant is present in the ink in any desired or effective amount to obtain the desired color and hue, typically at least about 1 percent by weight of the ink, and preferably at least about 5 percent by weight of the ink, and typically no more than about 15 percent by weight of the ink, and preferably no more than about 10 percent by weight of the ink, although the amount can be outside of these ranges.

Examples of suitable pigments include (but are not limited to) Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich): Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy): Paliogen Red 3871K (BASF), Paliogen Red 3340 (BASF): Lithol Fast Scarlet L4300 (BASF): Heliogen Blue L6900, L7020 (BASF): Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich); Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst), Permanent Yellow YE 0305 (Paul Uhlich), Lumogen Yellow D0790 (BASF); Suco-Yellow L1250 (BASF); Suco-Yellow DI 355 (BASF); Suco Fast Yellow D1355, D1351 (BASF); Hostaperm Pink E (American Hoechst); Fanal Pink D4830 (BASF); Cinquasia Magenta (Du Pont), Paliogen Black L0084 (BASF); Pigment Black K801 (BASF); and carbon blacks such as REGAL 330® (Cabot), Carbon Black 5250, Carbon Black 5750 (Columbia Chemical), and the like.

Examples of suitable dyes include (but are not limited to) Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc., D&C Yellow #10 (Acid Yellow 3), available from Tricon; Yellow Shade 16948, available from Tricon; Basacid Black X 34, available from BASF, Carta Black 2GT, available from Sandoz, Inc.; and the like. Also suitable are solvent dyes, including (but not limited to) spirit soluble dyes. Examples of suitable spirit solvent dyes include (but are not limited to) Neozapon Red 492 (BASF); Orasol Red G (Ciba-Geigy); Direct Brilliant Pink B (Crompton & Knowles); Aizen Spilon Red C-BH (Hodogaya Chemical): Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz), Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF): Brilliant Red F3B-SF VP-218 (Hoechst Celanese), and the like.

The inks of the present invention can also optionally contain a conductivity enhancing agent. The conductivity enhancing agent preferably is nonpolymeric. Examples of suitable conductivity enhancing agents include complexes of amines with sulfur-containing acids or acid salts and complexes of amines with phosphorus-containing compounds, with examples of amines including (a) alkyl amines, such as (1) 4-(hexadecylamino)benzylamine (Aldrich 38,966-8), (2) N-octanoyl-N-methyl-glucamine (Aldrich 34,389-7), (3) octanoic hydrazide (Aldrich 29,334-2), and the like; (b) anilines, such as (1) 4-hexadecyl sulfonyl aniline (Aldrich 14,338-3), and the like; (c) dianiline and bis dianiline compounds, such as (1) 2,2'-dithio dianiline (Aldrich 16,676-6), (2) 4,4'-dithiodianiline (Aldrich 36,946-26), (3) 3,3'-methylene dianiline (Aldrich 37,826-7), (4) 4,4'-methylene dianiline (Aldrich 13,245-4), (5) N-methyl-4,4'-methylene dianiline (Aldrich 42,282-7), (6) 4,4'-methylene bis(2,6-diethyl aniline) (Aldrich 36,078-3), (7) 4,4'-methylene bis(2,6-diisopropyl-N,N-dimethylaniline) (Aldrich 40,353-9), (8) 4,4'-methylene bis (N,N-dimethylaniline) (Aldrich M4,445-1), (9) 4,4'-methylene bis(2,6-dimethylaniline) (Aldrich 36,079-1), (10) 4,4-methylene bis(3-chloro-2,6-diethylaniline) (Aldrich 42,660-1), (11) 3,3'-(sulfonyl bis(4,1-phenylene))dianiline (Aldrich 44,095-7), (12) 4,4'-(1,3-phenylene diisopropylidene) bisaniline (Aldrich 45,048-0), and the like; and the like, as well as mixtures thereof. Examples of suitable sulfur-containing acids and acid salts with which the amines can be complexed include (1) 2,4-dinitrobenzene sulfonic acid dihydrate (Aldrich 38,106-3), (2) 2-propanesulfonic acid, sodium salt monohydrate (Aldrich 39,701-6), (3) p-toluenesulfonic acid monohydrate (Aldrich 40,288-5), (4) hydroxymethane sulfinic acid mono sodium salt dihydrate (Aldrich 16,351-1), and the like, as well as mixtures thereof. Examples of conductivity inducing phosphorous compounds with which the amines can be complexed include phosphorus-containing acid compounds, with specific examples including (1) phenylphosphinic acid (Aldrich P2,880-8), (2) dimethylphosphinic acid (Aldrich 32,829-4), (3) methyl phosphonic acid (Aldrich 28,986-8), and the like, as well as mixtures thereof. The amine and the phosphorus-containing compound or sulfur-containing acid or acid salt are present in any desired or effective amount with respect to each other, typically from about 0.3 mole of amine per every one mole of sulfur-containing acid or acid salt to about 3 moles of amine per every one mole of sulfur-containing acid or acid salt, although the relative amounts can be outside of this range.

Also suitable are conductivity enhancing agents such as (1) acetyl choline chloride ($CH_3COOCH_2CH_2N(CH_3)_3Cl$, Aldrich 13,535-6), (2) acetyl choline bromide ($CH_3COOCH_2CH_2N(CH_3)_3Br$; Aldrich 85,968-0), (3) acetyl-β-methyl choline bromide ($CH_3COOCH(CH_3)CH_2N(CH_3)_3Br$, Aldrich 85,554-5), (4) (diethyl-(4-aminobenzyl)

Phosphonate (Aldrich 33,847-8), (5) diethyl-(phthalimidomethyl)Phosphonate (Aldrich 36,622-6), (6) diethyl-(2,2,2-trifluoro-1-hydroxyethyl)Phosphonate (Aldrich 43,982-7), (7) diphenyl succinimidyl phosphate (Aldrich 45,061-8), (8) dihexadecyl phosphate (Aldrich 27,149-7), (9) undecylenic acid zinc salt (hardness value 68; Aldrich 32,958-4), (10) zincbis(2,2,6,6-tetramethy(-3,5-heptanedionate) (Aldrich 41,773-4), (11) zinccyclohexanebutyrate (Aldrich 22,841-9), (12) zinc stearate (Aldrich 30,756-4), (13) methyl-1-adamantane sulfonate (Aldrich 40,956-1), (14) octadecyl-4-chlorobenzene sulfonate (Aldrich 47,799-0), (15) tetrabutylammonium trifluoromethanesulfonate (Aldrich 34,509-1), (16) S,S'-ethylene-p-toluene thiosulfonate (Aldrich 23,257-2), (17) pyridinium-3-nitrobenzene sulfonate (Aldrich 27,198-5), (18) trimethylsulfonium methyl sulfate (Aldrich 30,359-3), (19) 1-(p-toluene sulfonyl)imidazole (Aldrich 24,424-4), (20) 1-(p-toluene sulfonyl)-3-nitro-1,2,4-triazole (Aldrich 24,417-1), (21) 2,4,6-triisopropyl benzene sulfonyl chloride (Aldrich 11,949-0), (22) 1-(2,4,6-triisopropyl benzene sulfonyl)imidazole (Aldrich 40,948-0), (23) 1-(2,4,6-triisopropyl benzene sulfonyl)-3-nitro-1,2,4-triazole (Aldrich 40,948-0), (24) 4-nitrobenzene sulfonyl chloride (Aldrich 27,224-8), (25) perfluoro decyl iodide (Aldrich 25,784-2), (26) 1,1,1,2,2,3,3,4,4,5,5,6,6,7,7,8,8-heptadeca fluoro-10-iododecane (Aldrich 37,052-5), and the like, as well as mixtures thereof.

The optional conductivity enhancing agent, when present, is present in the ink in any desired or effective amount, typically at least about 4 percent by weight of the ink, and preferably at least about 15 percent by weight of the ink, and typically no more than about 40 percent by weight of the ink, and preferably no more than about 35 percent by weight of the ink, although the amount can be outside of these ranges.

Optionally, the inks of the present invention can also contain an antioxidant. The optional antioxidants in the inks protect the images from oxidation and also protect the ink components from oxidation during the heating portion of the ink preparation process. Specific examples of suitable antioxidants include (but are not limited to) (1) N,N'-hexamethylene bis(3,5-di-tert-butyl-4-hydroxy hydrocinnamamide) (Irganox 1098, available from Ciba-Geigy Corporation), (2) 2,2-bis(4-(2-(3,5-di-tert-butyl-4-hydroxyhydrocinnamoyloxy))ethoxyphenyl)propane (Topanol-205, available from ICI America Corporation), (3) tris(4-tert-butyl-3-hydroxy-2,6-dimethyl benzyl) isocyanurate (Cyanox 1790, 41,322-4, LTDP, Aldrich D12,840-6), (4) 2,2'-ethylidene bis(4,6-di-tert-butylphenyl)fluoro phosphonite (Ethanox-398, available from Ethyl Corporation), (5) tetrakis(2,4-di-tert-butylphenyl)-4,4'-biphenyl diphosphonite (Aldrich 46,852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25,106-2), (9) 2,4-di-tert-butyl-6(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α,α,α-trifluoro-o-cresol (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-trifluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl)phenoxy)phenoxy) propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), and the like, as well as mixtures thereof.

The optional antioxidant, when present, is present in the ink in any desired or effective amount, typically at least about 0.25 percent by weight of the ink, and preferably at least about 1 percent by weight of the ink, and typically no more than about 10 percent by weight of the ink, and preferably no more than about 5 percent by weight of the ink, although the amount can be outside of these ranges.

The inks of the present invention can also optionally contain a UV absorber. The optional UV absorbers primarily protect the images generated therewith from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl)bis(3,3,5,5-tetramethylpiperazinone) (commercially, available from Goodrich Chemicals), (12) 2,2,4-trimethyl-1,2-hydroquinoline (commercially available from Mobay Chemical), (13) 2-(4-benzoyl-3-hydroxy phenoxy) ethylacrylate, (14) 2-dodecyl-N-(1,2,2,6,6-pentamethyl-4-piperidinyl)succinimide (commercially available from Aldrich Chemical Co., Milwaukee, Wis.), (15) 2,2,6,6-tetramethyl-4-piperidinyl/β,β,β',β'-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetramethyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β,ββ',β'-tetramethyl-3,9-(2,4,8,10-tetra oxo-spiro-(5,5) undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino)benzophenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof.

When present, the optional UV absorber is present in the ink in any desired or effective amount, typically at least about 1 percent by weight of the ink, and preferably at least about 3 percent by weight of the ink, and typically no more than about 10 percent by weight of the ink, and preferably no more than about 5 percent by weight of the ink, although the amount can be outside of these ranges.

The inks of the present invention can be prepared by any suitable method, such as by simple mixing of the ink components, followed by heating to a temperature of, for example, about 140° C. and stirring for, for example, about 60 minutes until a homogeneous solution has formed, followed by cooling to about 25° C.

The ink compositions of the present invention typically have melting points no lower than about 60° C., and preferably no lower than about 90° C., and typically have melting points no higher than about 150° C., and preferably no higher than about 120° C., although the melting point can be outside of these ranges.

In embodiments wherein the ink compositions of the present invention are used in acoustic ink printing processes, the inks generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 25 centipoise, preferably no more than about 20 centipoise, and even more preferably no more than about 10 centipoise, and typically of no less than about 2 centipoise, preferably no less than about 5 centipoise, and even more preferably no less than about 7 centipoise, although the melt viscosity can be outside of these ranges. Higher melt viscosities are suitable for piezoelectric ink jet printing processes. Since image hardness tend to drop with lower viscosities, it is preferred that the viscosity be as low as possible while still retaining the desired degree of image hardness.

Hardness is a property of solids and plastics that is defined by their solidity and firmness as measured by their resistance to indentation by an indenter of fixed shape and size under a static load. The hardness of images can be measured with a Digital-Pencil style Durometer, Model 211B-00 PTC, obtained from Pacific Transducer Corporation, using ASTM Standard specifications for resistance to penetration with a conical (30 degrees included angle) indenter and applying a 1 kilogram load. The hardness range for materials as measured with this instrument is from about 1 to about 100, the latter being the highest measurable value. It is believed that the images generated with the inks of the present invention, after cooling to ambient temperature (typically from about 20 to about 25° C., although ambient temperature can be outside of this range) will exhibit hardness values of at least about 70 or more, and in some embodiments will exhibit hardness values of about 80 or about 85.

In embodiments wherein the inks of the present invention are employed in acoustic ink printing processes, the inks typically undergo, upon heating, a change from a solid state to a liquid state in a period of less than about 100 milliseconds, preferably less than about 50 milliseconds, and more preferably less than about 10 milliseconds, although the time can be outside of these ranges. There is no necessary lower limit on this period of time for the inks; it is believed that practically achievable lower limits are around 5 milliseconds, although, if practically achievable, lower periods of time are acceptable.

When used in acoustic ink printing applications, the inks of the present invention typically exhibit acoustic loss values of no more than about 100 decibels per millimeter, preferably no more than about 60 decibels per millimeter, and more preferably no more than about 40 decibels per millimeter, although the acoustic loss value can be outside of these ranges. There is no necessary lower limit on acoustic loss value for the inks; it is believed that practically achievable lower limits are around 10 decibels per millimeter, although, if practically achievable, lower acoustic loss values are acceptable. Acoustic loss can be measured by placing a sample of the material to be measured between two transducers with the temperature set at about 150° C. The samples are allowed to equilibrate at 150° C. for five minutes. The two transducers are then brought together to maximize the acoustic signal. The amplitude and the position of the signals are recorded. The two transducers are then separated by a distance varying from about 25.4 microns to about 125.4 microns, recording each time the amplitude and the position of the signal. Preferably, each measurement is performed three times, and three samples of the same material are measured. The attenuation decibels per millimeter is then calculated by ratioing the amplitude values obtained at different separation distances.

The inks of the present invention typically exhibit a conductivity of no less than about 2 log(picomho/cm), preferably no less than about 6 log(picomho/cm), and more preferably no less than about 6.5 log(picomho/cm), and even more preferably no less than about 7 log(picomho/cm), although the conductivity can be outside of these ranges. While there is no upper limit on conductivity, typical conductivity values generally do not exceed about 9 log (picomho/cm). Conductivity can be measured under melt conditions (typically at about 150° C.) by placing an aluminum electrode in the molten ink and reading the resistivity output on a GenRad 1689 precision RLC Digibridge at a frequency of 1 kiloHertz. The conductivity of the material is measured in terms of the reciprocal of resistivity, which is the capacity for electrical resistance.

The inks of the present invention exhibit substantial transparency. The images generated with the inks typically exhibit haze values of no more than about 25, preferably no more than about 15, and more preferably no more than about 10, although the haze value can be outside of these ranges. There is no required lower limit on haze values. Haze values can be measured on images printed with the ink on uncoated polyester, such as MYLAR®, with a Haze meter XL-211, HAZEGARD® System obtained from Pacific Scientific Company.

The inks of the present invention generate images with desirable crease resistance. The images generated with the inks typically exhibit crease values of no more than about 0.6 millimeters, preferably no more than about 0.2 millimeters, and more preferably no more than about 0.1 millimeters, although the crease value can be outside of these ranges. There is no lower limit on crease values; ideally, this value is zero. The average width of the creased image can be measured by printing an image on paper, followed by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer. The crease value can also be reported in terms of area, especially when the image is sufficiently hard to break unevenly on creasing. Measured in terms of area, crease values of 60 millimeters correspond to about 0.6, crease values of 40 millimeters correspond to about 0.4, crease values of 10 millimeters correspond to about 0.1, and the like.

Any suitable print substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The inks of the present invention are particularly suitable for printing processes wherein the print substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances.

The present invention is also directed to a process which entails incorporating an ink of the present invention into an ink jet printing apparatus, melting the ink, and causing droplets of the melted ink to be ejected in an imagewise pattern onto a print substrate. In one specific embodiment, the printing apparatus employs an acoustic ink jet process, wherein droplets of the ink are caused to be ejected in imagewise pattern by acoustic beams. In another specific embodiment, the printing apparatus employs an acoustic ink jet printing process wherein droplets of the ink are formed by acoustic beams without imparting a substantial velocity component toward the print substrate, using a droplet forming force that is sufficient only to form the ink droplets, and the printing process further comprises generating an electric field to exert an electrical force different from the droplet forming force on the ink droplets to move the ink droplets toward the print substrate, and controlling the electrical force exerted on the formed complete ink droplets by the electric field. The inks of the present invention are also suitable for piezoelectric ink jet printing processes, wherein the printing process entails incorporating the ink into an ink jet printing apparatus, melting the ink, and causing droplets of the melted ink to be ejected in an imagewise pattern onto a print substrate, wherein the printing apparatus employs a piezoelectric ink jet process, wherein droplets of the ink are caused to be ejected in imagewise pattern by oscillations of piezoelectric vibrating elements.

Specific embodiments of the invention will now be described in detail. These examples are intended to be illustrative, and the invention is not limited to the materials, conditions, or process parameters set forth in these embodiments. All parts and percentages are by weight unless otherwise indicated.

Acoustic loss measurements in the Examples were measured by placing samples of the materials between the two transducers with the temperature set at 150° C. The samples were allowed to equilibrate at 150° C. for five minutes. The two transducers were then brought together to maximize the acoustic signal. The amplitude and the position of the signals were recorded. The two transducers were then separated by a distance varying from 25.4 microns to 125.4 microns, recording each time the amplitude and the position of the signal. Each measurement was performed three times, and three samples of each material were measured. The attenuation decibels per millimeter was then calculated by ratioing the amplitude values obtained at different separation distances.

Optical density values in the Examples were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numeric keyboard for selection of operating parameters and the entry of tristimulus values, and an alphanumeric keyboard for entry of product standard information.

Viscosity values in the Examples were measured at 150° C. with a Stress Rheometer, obtained from Cari-Med, Model CSL 100. All experiments were performed at a shear rate of 1,250 $s_{-1}$.

Crease values in the Examples were measured on solid area images printed on paper by (a) folding inwards the printed area of the image, (b) passing over the folded image a standard TEFLON® coated copper roll 2 inches in width, 3 inches in outer diameter, 2.25 inches in inner diameter, and weighing 860 grams, (c) unfolding the paper and wiping the loose ink from the creased imaged surface with a cotton swab, and (d) measuring the average width of the ink free creased area with an image analyzer.

Haze values in the Examples were measured on images printed on uncoated polyester (such as MYLAR®) with a Haze meter XL-211, HAZEGARD® System, obtained from Pacific Scientific Company.

The hardness values in the Examples were measured with a Digital-Pencil style Durometer, Model 211B-00 PTC, obtained from Pacific Transducer Corporation, using ASTM Standard specifications for resistance to penetration with a conical (30 degrees included angle) indenter and applying a 1 kilogram load. The hardness range for materials as measured with this instrument is from about 1 to about 100, the latter being the highest measurable value, Conductivity values in the Examples were measured under melt conditions at 150° C. by placing an aluminum electrode in the melt and reading the resistivity output on a GenRad 1689 precision RLC Digibridge at a frequency of 1 kilohertz. Conductivity was calculated from the resistivity data.

The gloss values in the Examples were obtained on a 75° Glossmeter, Glossgard II, obtained from Pacific Scientific (Gardner/Neotec Instrument Division).

The spherulite sizes in the Examples were measured with an optical microscope with cross polarized light.

Lightfast values in the Examples were measured in a Mark V Lightfast Tester, obtained from Microscal Company, London, England.

Waterfast values in the Examples were obtained from the optical density data recorded before and after washing the images with water at 25° C. for five minutes.

EXAMPLE I

A black phase change ink was prepared by mixing 15 percent by weight polyethylene monoalcohol (polymeric binder, Mn=700; viscosity at 150° C. 7.9 centipoise; melting point 110° C.; hardness value 78.5; Aldrich 44,448-0), 45 percent by weight 4-hydroxy-3-methoxy benzyl alcohol (viscosity modifier; hardness value 83.4; acoustic loss value 27 decibels per millimeter; melting point 115° C.; Aldrich 17,553-6), 30 percent by weight of a conductive complex of 4,4'-methylene bis (2,6-dimethylaniline) (present in an amount of 15 percent by weight of the ink; melting point 122° C.; Aldrich 36,079-1) with p-toluenesulfonic acid monohydrate (present in an amount of 15 percent by weight of the ink: melting point 105° C.; conductivity 7.5 log (picomho/cm); Aldrich 40,288-5), 5 percent by weight tetrakis(2,4-ditert butyl phenyl)-4,4'-biphenyl diphosphonite (antioxidant; hardness value 90; Aldrich 46,852-5), and 5 percent by weight Neozapon Black X51 dye (C.I. Solvent Black; C.I. 12195; obtained from BASF). The resulting mixture was heated to a temperature of about 140° C. and stirred for a period of about 60 minutes until it formed a homogeneous solution, followed by cooling the solution to 25° C. The resulting black ink exhibited a hardness value of 78.5 at 23° C. with an acoustic loss value of 58 decibels per millimeter, a viscosity of 8.5 centipoise, and a conductivity of 6.9 log(picomho/cm) at 150° C.

EXAMPLE II

A blue phase change ink was prepared by mixing 15 percent by weight polyethylene-block-poly(ethylene glycol) (polymeric binder, Mn=1400; 50 percent by weight ethylene oxide; melting point 115° C.; Aldrich 45,896-1), 45 percent by weight xylitol (viscosity modifier; acoustic loss value 32 decibels per millimeter; melting point 96° C.; Aldrich 85,158-2), 30 percent by weight of a conductive complex of 4,4'-methylene bis(2,6-dimethylaniline) (present in an amount of 15 percent by weight of the ink; melting point 122° C.; Aldrich 36,079-1) with 2,4-dinitrobenzene sulfonic acid dihydrate (present in an amount of 15 percent by weight of the ink, melting point 108° C.; conductivity 7.6log (picomho/cm); Aldrich 38,106-3), 5 percent by weight tetrakis (2,4-ditert butyl phenyl)-4,4'-biphenyl diphosphonite (antioxidant; hardness value 90; Aldrich 46,852-5), and 5 percent by weight Sudan Blue 670 dye (C.I. #61554; obtained from BASF). The resulting mixture was heated to a temperature of about 140° C. and stirred for a period of about 60 minutes until it formed a homogeneous solution, followed by cooling the solution to 25° C. The resulting blue ink exhibited a hardness value of 79 at 23° C., an acoustic loss value of 58 decibels per millimeter, a viscosity of 8.2 centipoise, and a conductivity of 6.7 log(picomho/cm) at 150° C.

EXAMPLE III

A yellow phase change ink was prepared by mixing 15percent by weight oxidized polyethylene (polymeric binder; Mn=1300; viscosity at 125° C. 225 centipoise; Aldrich 19,191-4), 45 percent by weight 2,2-dimethyl-1-phenyl-1,3-propanediol (viscosity modifier; hardness value 75; acoustic loss value 29 decibels per millimeter; melting point 80° C.; Aldrich 40,873-5), 30 percent by weight of a conductive complex of 4,4'-methylene bis(2,6-dimethylaniline) (present in an amount of 15 percent by weight of the ink; melting point 122° C.; Aldrich 36,079-1) with 2-propanesulfonic acid, sodium salt monohydrate (present in an amount of 15 percent by weight of the ink; melting point 81° C.; conductivity 7.4 log(picomho/cm); Aldrich 39,701-6), 5 percent by weight tetrakis (2,4-ditert butyl phenyl)-4,4'-biphenyl diphosphonite (antioxidant, hardness value 90; Aldrich 46,852-5), and 5 percent by weight Sudan Yellow 146 dye (C.I. #12700; obtained from BASF). The resulting mixture was heated to a temperature of about 140° C. and stirred for a period of about 60 minutes until it formed a homogeneous solution, followed by cooling the solution to 25° C. The resulting yellow ink exhibited a hardness value of 78 at 23° C., an acoustic loss value of 61 decibels per millimeter, a viscosity of 9.0 centipoise, and a conductivity of 6.8 log(picomho/cm) at 150° C.

EXAMPLE IV

A magenta phase change ink was prepared by mixing 15 percent by weight poly(ethylene-co-acrylic acid) (polymeric binder; acrylic acid content 20 percent by weight, hardness value 78.6; obtained from Aldrich Chemical Co., Milwaukee, Wis.), 45 percent by weight 2,2'-(1,4-phenylenedioxy)diethanol (hardness value 82; acoustic loss value decibels per millimeter; melting point 102° C., Aldrich 23,791-4), 30percent by weight of a conductive complex of 4,4'-methylene bis(2,6-dimethylaniline) (present in an amount of 15 percent by weight of the ink; melting point 122° C.; Aldrich 36,079-1) with hydroxymethane sulfinic acid monosodium salt dihydrate (present in an amount of 15 percent by weight of the ink; melting point 70° C.; conductivity 7.2 (log(picomho/cm); Aldrich 16,351-1), 5 percent by weight tetrakis(2,4-ditert butyl phenyl)-4,4'-biphenyl diphosphonite (antioxidant; hardness value 90; Aldrich 46,852-5), and 5 percent by weight Sudan Red 462 dye (C.I. #26050; obtained from BASF). The resulting mixture was heated to a temperature of about 140° C. and stirred for a period of about 60 minutes until it formed a homogeneous solution, followed by cooling the solution to 25° C. The resulting magenta ink exhibited a hardness value of 78 at 23° C., an acoustic loss value of 57 decibels per millimeter, a viscosity of 8.3 centipoise, and a conductivity of 6.6log (picomho/cm) at 150° C.

EXAMPLE V

Each of the inks prepared as described in Examples I through IV was incorporated into an acoustic ink jet printing test fixture utilizing the ejection mechanism disclosed in *J. Appl. Phys.*, 65(9), May 1, 1989, and references therein, the disclosures of each of which are totally incorporated herein by reference. A jetting frequency of 160 MHz was used to generate drops of about 2 picoliters, up to 12 drops per pixel at 600 spi. The images formed on paper exhibited excellent color quality, hardness values of 79±1 at 23° C., optical density values of 2.20 (black), 1.71 (cyan), 2.03 (magenta), 1.40 (yellow), crease values of 0.09 mm (black), 0.08 mm (magenta), 0.10 mm (cyan), 0.07 mm (yellow), and gloss values of 85 (black), 81 (magenta), 83 (cyan), 78 (yellow). The waterfastness and lightfastness values of these images were greater than 95 percent in all cases. The ink spherulite radius of the inks was measured at 1 to 3 microns, leading to haze values of 13 to 18 when printed on transparency substrates.

EXAMPLE VI

A black phase change ink was prepared by mixing 15 percent by weight polyethylene monoalcohol (polymeric binder; Mn=700; viscosity at 150° C. 7.9 centipoise; melting point 110° C.; hardness value 78.5, Aldrich 44,448-0), 45 percent by weight 2,2-bis(hydroxymethyl)-2,2',2"-nitrilotriethanol (viscosity modifier; hardness value 82.2; melting point 130° C.; Aldrich 15,666-3), 30 percent by weight of a conductive complex of 4,4'-methylene bis(2,6-diisopropyl-N,N-dimethylaniline) (present in an amount of 15 percent by weight of the ink; melting point 120° C.; Aldrich 40,353-9) with p-toluenesulfonic acid monohydrate (present in an amount of 15 percent by weight of the ink; melting point 105° C.; conductivity 7.45 log(picomho/cm); Aldrich 40,288-5), 5 percent by weight tetrakis(2,4-ditert butyl phenyl)-4,4'-biphenyl diphosphonite (antioxidant; hardness value 90; Aldrich 46,852-5), and 5 percent by weight Neozapon Black X51 dye (C.I. Solvent Black; C.I. #12195; obtained from BASF). The resulting mixture was heated to a temperature of about 140° C. and stirred for a period of about 60 minutes until it formed a homogeneous solution, followed by cooling the solution to 25° C. The resulting black ink exhibited a hardness value of 80 at 23° C., an acoustic loss value of 59 decibels per millimeter, a viscosity of 8.6 centipoise, and a conductivity of 6.85 log(picomho/cm) at 150° C.

EXAMPLE VII

A blue phase change ink was prepared by mixing 15 percent by weight polyethylene-block-poly(ethylene glycol) (polymeric binder, Mn=1400: 50 percent by weight ethylene oxide; melting point 115° C.; Aldrich 45,896-1), 45 percent by weight di(trimethylolpropane) (viscosity modifier, hardness value 85.8; acoustic loss value 35 decibels per millimeter, melting point 111° C.; Aldrich 41,613-4), 30 percent by weight of a conductive complex of 4,4'-methylene bis(2,6-diisopropyl-N,N-dimethylaniline) (present in an amount of 15 percent by weight of the ink; melting point 120° C.; Aldrich 40,353-9) with 2,4-dinitrobenzene sulfonic acid dihydrate (present in an amount of 15 percent by weight of the ink; melting point 108° C.: conductivity 7.5log(picomho/cm); Aldrich 38,106-3), 5 percent by weight tetrakis(2,4-ditert butyl phenyl)-4,4'-biphenyl diphosphonite (antioxidant: hardness value 90; Aldrich 46,852-5), and 5 percent by weight Sudan Blue 670 dye (C.I. #61554; obtained from BASF). The resulting mixture was heated to a temperature of about 140° C. and stirred for a period of about 60 minutes until it formed a homogeneous solution, followed by cooling the solution to 25° C. The resulting blue ink exhibited a hardness value of 81 at 23° C., an acoustic loss value of 59 decibels per millimeter, a viscosity of 8.3 centipoise, and a conductivity of 6.65 log(picomho/cm) at 150° C.

EXAMPLE VIII

A yellow phase change ink was prepared by mixing 15percent by weight polyethylene monocarboxylic acid (polymeric binder: hardness value 78.7; Aldrich 40,706-2), 45 percent by weight 4,4'-trimethylene bis(1-piperidine ethanol) (viscosity modifier; hardness value 78; acoustic loss value 28 decibels per millimeter; melting point 96° C.: Aldrich 12,122-35), 30 percent by weight of a conductive complex of 4,4'-methylene bis(2,6-diisopropyl-N,N-dimethylaniline) (present in an amount of 15 percent by weight of the ink; melting point 120° C.; Aldrich 40,353-9) with 2-propanesulfonic acid, sodium salt monohydrate (present in an amount of 15 percent by weight of the ink; melting point 81° C.; conductivity 7.35 log(picomho/cm); Aldrich 39,701-6), 5 percent by weight tetrakis(2,4-ditert butyl phenyl)-4,4'-biphenyl diphosphonite (antioxidant; hardness value 90; Aldrich 46,852-5), and 5 percent by weight Sudan Yellow 146 dye (C.I. #12700; obtained from BASF). The resulting mixture was heated to a temperature of about 140° C. and stirred for a period of about 60 minutes until it formed a homogeneous solution, followed by cooling the solution to 25° C. The resulting yellow ink exhibited a hardness value of 77.5 at 23° C., an acoustic loss value of 62 decibels per millimeter, a viscosity-of 9.1 centipoise, and a conductivity of 6.75 log(picomho/cm) at 150° C.

EXAMPLE IX

A magenta phase change ink was prepared by mixing 15 percent by weight poly(ethylene-co-acrylic acid) (polymeric binder; acrylic acid content 20 percent by weight; hardness value 78.6; obtained from Aldrich Chemical Co., Milwaukee, Wis.), 45 percent by weight N-methyl-D-glucamine (viscosity modifier, hardness value 83.2; acoustic loss value 30 decibels per millimeter; melting point 130° C.; Aldrich M4,700-0), 30 percent by weight of a conductive complex of 4,4'-methylene bis(2,6-diisopropyl-N,N-dimethylaniline) (present in an amount of 15 percent by weight of the ink; melting point 120° C.; Aldrich 40,353-9) with hydroxymethane sulfinic acid monosodium salt dihydrate (present in an amount of 15 percent by weight of the ink, melting point 70° C.; conductivity 7.25 log(picomho/cm); Aldrich 16,351-1), 5 percent by weight tetrakis(2,4-ditert butyl phenyl)-4,4'-biphenyl diphosphonite (antioxidant; hardness value 90; Aldrich 46,852-5), and 5 percent by weight Sudan Red 462 dye (C.I. #26050; obtained from BASF). The resulting mixture was heated to a temperature of about 140° C. and stirred for a period of about 60 minutes until it formed a homogeneous solution, followed by cooling the solution to 25° C. The resulting magenta ink exhibited a hardness value of 80 at 23° C., an acoustic loss value of 58 decibels per millimeter, a viscosity of 8.35 centipoise, and a conductivity of 6.55 log(picomho/cm) at 150° C.

EXAMPLE X

Each of the inks prepared as described in Examples VI through IX was incorporated into an acoustic ink jet printing test fixture utilizing the ejection mechanism disclosed in *J. Appl. Phys.*, 65(9), May 1, 1989, and references therein, the disclosures of each of which are totally incorporated herein by reference. A jetting frequency of 160 MHz was used to generate drops of about 2 picoliters, up to 12 drops per pixel at 600 spi. The images formed on paper exhibited excellent color quality, with hardness values of 79±2 at 23° C., optical density values of 2.10 (black), 1.67 (cyan), 2.01 (magenta), 1.41 (yellow), crease values of 0.11 mm (black), 0.09 mm (magenta), 0.12 mm (cyan), 0.09 mm (yellow), and gloss values of 84 (black), 82 (magenta), 82 (cyan), 79 (yellow). The waterfastness and lightfastness values of these images were greater than 90 percent in all cases. The ink spherulite radius of the inks was measured at 1 to 3 microns, leading to haze values of 13 to 18 when printed on transparency substrates.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition comprising (a) a polyethylene homopolymer or copolymer binder having a melting point of from about 60 to about 150° C., (b) a nonpolymeric alcohol viscosity modifier having a melting point of from about 60 to about 150° C. which is (1) 2-hydroxybenzyl alcohol, (2) 4-hydroxybenzyl alcohol, (3) 4-nitrobenzyl alcohol, (4) 4-hydroxy-3-methoxy benzyl alcohol, (5) 3-methoxy-4-nitrobenzyl alcohol, (6) 2-amino-5-chlorobenzyl alcohol, (7) 2-amino-5-methylbenzyl alcohol, (8) 3-amino-2-methylbenzyl alcohol, (9) 3-amino-4-methyl benzyl alcohol, (10) 2(2-(aminomethyl)phenylthio)benzyl alcohol, (11) 2,4,6-trimethylbenzyl alcohol, (12) 2-amino-2-methyl-1,3-propanediol, (13) 2-amino-1-phenyl-1,3-propanediol, (14) 2,2-dimethyl-1-phenyl-1,3-propanediol, (15) 2-bromo-2-nitro-1,3-propanediol, (16) 3-tertbutylamino-1,2-propanediol, (17) 1,1-diphenyl-1,2-propanediol, (18) 1,4-dibromo-2,3-butanediol, (19) 2,3-dibromo-1,4-butanediol, (20) 2,3-dibromo-2-butene-1,4-diol, (21) 1,1,2-triphenyl-1,2-ethanediol,. (22) 2-naphthalenemethanol, (23) 2-methoxy-1-naphthalenemethanol, (24) decafluoro benzhydrol, (25) 1-benzeneethanol, (26) 4,4'-isopropylidene bis(2-(2,6-dibromo phenoxy)ethanol), (27) 2,2'-(1,4-phenylenedioxy) diethanol, (28) 2,2'-bis(hydroxymethyl)-2,2',2"-nitrilotriethanol, (29) di(trimethylolpropane), (30) 2-amino-3-phenyl-1-propanol, (31) tricyclohexylmethanol, (32) tris(hydroxymethyl)aminomethane succinate, (33) 4,4'-trimethylene bis(1-piperidine ethanol), (34) N-methyl glucamine, (35) xylitol or mixtures thereof, (c) a colorant, (d) an optional conductivity enhancing agent, (e) an optional antioxidant, and (f) an optional UV absorber.

2. An ink composition according to claim 1 wherein the binder is a polyethylene monoalcohol, a polyethylene-block-poly(alkylene glycol), an oxidized polyethylene, a polyethylene monocarboxylic acid, a copolymer of ethylene and an unsaturated acid, or a mixture thereof.

3. An ink composition according to claim 1 wherein the binder is a polyethylene-block-poly(ethylene glycol), a poly(ethylene-co-acrylic acid), a poly(ethylene-co-methacrylic acid), or a mixture thereof.

4. An ink composition according to claim 1 wherein the binder is present in the ink in an amount of at least about 5 percent by weight of the ink, and wherein the binder is present in the ink in an amount of no more than about 30 percent by weight of the ink.

5. An ink composition according to claim 1 wherein the viscosity modifier is present in the ink in an amount of at least about 30 percent by weight of the ink, and wherein the viscosity modifier is present in the ink in an amount of no more than about 55 percent by weight of the ink.

6. An ink composition according to claim 1 wherein the colorant is a dye.

7. An ink composition according to claim 1 containing a conductivity enhancing agent which is a complex of (a) an amine and (b) either (i) a sulfur-containing acid or acid salt or (ii) a phosphorus-containing compound.

8. An ink composition according to claim 7 wherein the amine is an alkyl amine, an aniline, a dianiline, a bis dianiline, or a mixture thereof.

9. An ink composition according to claim 7 wherein the amine is (1) 4-(hexadecylamino)benzylamine, (2) N-octanoyl-N-methyl-glucamine, (3) octanoic hydrazide, (4) 4-hexadecyl sulfonyl aniline, (5) 2,2'-dithio dianiline, (6) 4,4'-dithiodianiline, (7) 3,3'-methylene dianiline, (8) 4,4'-methylene dianiline, (9) N-methyl-4,4'-methylene dianiline, (10) 4,4'-methylene bis(2,6-diethyl aniline), (11) 4,4'-methylene bis(2,6-diisopropyl-N, N-dimethylaniline), (12) 4,4'-methylene bis(N,N-dimethylaniline), (13) 4,4'-methylene bis(2,6-dimethylaniline), (14) 4,4'-methylene bis(3-chloro-2,6-diethylaniline), (15) 3,3'-(sulfonyl bis(4,1-phenylene))dianiline, (16) 4,4'-(1,3-phenylene diisopropylidene) bisaniline, or mixtures thereof.

10. An ink composition according to claim 7 wherein the sulfur-containing acid or acid salt is a sulfonic acid, a sulfonic acid salt, a sulfinic acid, a sulfinic acid salt, or a mixture thereof and wherein the phosphorus-containing compound is a phosphinic acid, a phosphonic acid, or a mixture thereof.

11. An ink composition according to claim 7 wherein the sulfur-containing acid or acid salt is (1) 2,4-dinitrobenzene sulfonic acid, (2) 2-propanesulfonic acid salt, (3) p-toluenesulfonic acid, (4) hydroxymethane sulfinic acid salt, or a mixture thereof and wherein the phosphorus-containing compound is (i) phenylphosphinic acid, (ii) dimethylphosphinic acid, (iii) methyl phosphonic acid, or mixtures thereof.

12. An ink composition according to claim 1 containing a conductivity enhancing agent in an amount of at least about 4 percent by weight of the ink, and containing a conductivity enhancing agent in an amount of no more than about 40 percent by weight of the ink.

13. An ink composition according to claim 1 wherein the ink has a hardness value of at least about 70 at temperatures of from about 20 to about 25° C.

14. An ink composition according to claim 1 wherein the ink has a melting point of no lower than about 60° C., and wherein the ink has a melting point of no higher than about 150° C.

15. An ink composition according to claim 1 wherein the ink has a haze value of no more than about 25.

16. A process which comprises incorporating into an ink jet printing apparatus an ink composition according to claim 1, melting the ink, and causing droplets of the melted ink to be ejected in an imagewise pattern onto a print substrate.

17. A process according to claim 16 wherein the printing apparatus employs an acoustic ink jet process, wherein droplets of the ink are caused to be ejected in imagewise pattern by acoustic beams.

18. A process according to claim 16 wherein the printing apparatus employs an acoustic ink jet printing process wherein droplets of the ink are formed by acoustic beams without imparting a substantial velocity component toward the print substrate, using a droplet forming force that is sufficient only to form the ink droplets, and wherein the printing process further comprises generating an electric field to exert an electrical force different from the droplet forming force on the ink droplets to move the ink droplets toward the print substrate, and controlling the electrical force exerted on the formed complete ink droplets by the electric field.

19. A process according to claim 16 wherein the printing apparatus employs a piezoelectric ink jet process, wherein droplets of the ink are caused to be ejected in imagewise pattern by oscillations of piezoelectric vibrating elements.

* * * * *